United States Patent [19]

Nakagome et al.

[11] 4,115,815
[45] Sep. 19, 1978

[54] FACSIMILE SIGNAL CODING METHOD

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 737,072

[22] Filed: Nov. 1, 1976

[30] Foreign Application Priority Data

Oct. 30, 1975 [JP] Japan .............................. 50-130842

[51] Int. Cl.² ............................................. H04N 1/40
[52] U.S. Cl. ............................ 358/260; 340/347 DD; 358/261
[58] Field of Search ................. 358/261; 340/347 DD

[56] References Cited

U.S. PATENT DOCUMENTS

| 3,813,485 | 5/1974 | Arps | 358/261 |
| 3,830,966 | 8/1974 | Aldrich | 358/261 |
| 3,916,095 | 10/1975 | Weber | 358/261 |
| 3,927,251 | 12/1975 | White | 358/261 |

Primary Examiner—Howard W. Britton
Attorney, Agent, or Firm—Robert E. Burns; Emmanuel J. Lobato; Bruce L. Adams

[57] ABSTRACT

A facsimile signal coding method, in which information change picture elements are classified into two kinds of change points according to the information change directions. In case of the information change picture element having an information change from white to black, the relative distance between an instant information change picture element and a reference information change picture element selected from information change picture elements on the same scanning line or at least one immediately preceding scanning line is coded. In case of the information change picture element having an information change from black to white, the distance between an instant information change picture element to be coded and the immediately preceding information change picture element is predicted on the basis of information of a run already coded, so that an error between the predicted value and the run length of the instant run is coded. If the error exceeds the run length of the instant run, the run length of the instant run may be exceptionally coded.

2 Claims, 8 Drawing Figures

FACSIMILE SIGNAL CODING METHOD

This invention relates to a coding method which is used for efficient transmission or storage of signals having a two-dimensional correlation, such as facsimile signals.

The methods which have heretofore been proposed for coding of facsimile signals are (1) the run-length coding method in which signals of one scanning line obtained by scanning, are converted to a time serial configuration and then the magnitudes of the run lengths of white and black are sequentially coded and transmitted; and (2) the plane coding method in which signals of a plurality of scanning lines are subjected to batch processing and then coded and transmitted. However, since the coding method (1) does not utilize the property of picture signals that they have high correlation in a vertical direction, this is not sufficient in the compression effect. The method (2) is excellent in the compression effect, as compared with the method (1), but has such a demerit that a memory used becomes generally large and complicated in construction.

As a facsimile signal coding method which avoids the defects of the above said two coding methods and greatly eliminates redundancy of the facsimile signal by a memory of relatively small capacity and a simple equipment to thereby enable remarked compression of a required transmission time with respect to the band-time area, the present inventors have already proposed an information change picture element coding method in U.S. Pat. No. 4,040,093. In the coding of addresses of information change picture elements in facsimile signals, an information change picture element (including a picture element at either end of the scanning line) is selected which is considered to have higher correlation to the information change picture element desired to be coded than any other information change picture elements on a scanning line including the information change picture element to be coded (which scanning line will hereinafter be referred to as the to-be-coded scanning line) and on the scanning line immediately preceding the to-be-coded scanning line (which scanning line will hereinafter be referred to as the reference scanning line), and the relative distance of this information change picture element (hereinafter referred to as the final reference information change picture element) to the information change picture element desired to be coded is coded. However, the above run-length predictive coding method has such a disadvantage that the compression effect is not sufficient for the coding of the white run, i.e. information change point from white to black.

An object of this invention is to provide a facsimile signal coding method capable of effectively reducing the transmission time of each white run.

To attain the above object of this invention, information change picture elements are classified into two kinds of change points according to the information change directions. In case of the information change picture element having an information change from white to black, the relative distance between an instant information change picture element and a reference information change picture element selected from information change picture elements on the same scanning line or at least one immediately preceding scanning line is coded. In case of the information change picture element having an information change from black to white, the distance between an instant information change picture element to be coded and the immediately preceding information change picture element is predicted on the basis of information of a run already coded, so that an error between the predicted value and the run length of the instant run is coded. If the error exceeds the run length of the instant run, the run length of the instant run may be exceptionally coded.

The present invention will be clearly understood from the following detailed description taken in conjunction with the accompanying drawings, in which.

At first, the information change picture element coding method and the run-length predictive coding method employed in this invention will be described.

Figure 1:
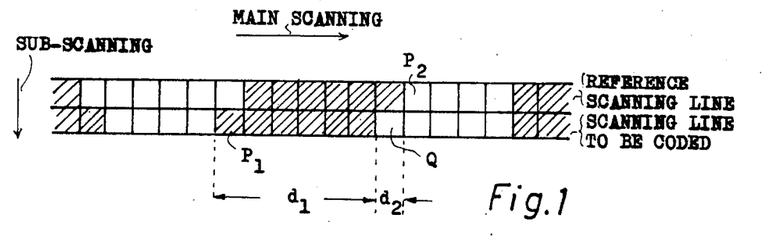
FIG. 1 is a scanning line pattern explanatory of the principle of the information change picture element coding method employed in this invention.

For describing the former method, FIG. 1 is a diagram showing an example of the facsimile signal, Q, $P_1$ and $P_2$ denoting information change picture elements (hereinafter referred to as the change points). Let it be assumed that the address of the change point Q is to be coded. In relation to the to-be-coded change point Q, the reference change points $P_1$ and $P_2$ are defined as follows:

$P_1$: A change point included in the to-be-coded scanning line and immediately preceding the to-be-coded change point Q. When such a change point does not exist, a first picture element (at the left end) of the to-be-coded scanning;

$P_2$: A first change point included in the reference scanning line, lying further to the right than the reference change point $P_1$ and having the same information change direction as the to-be-coded change point Q. In a case where such a change point does not exist, the last picture element (at the right end) of the reference scanning line. A final reference change point is selected from the reference change points $P_1$ and $P_2$ as follows:

(i) When $d_1 (=\overline{P_1Q}) < |d_2| (=\overline{P_2Q})$, $P_1$ is selected.

(ii) When $|d_2| (=\overline{P_2Q}) < |d_1| (=\overline{P_1Q})$, $P_2$ is selected.

Namely, the reference change point closer to the to-be-coded change point Q than the other is used as the final reference change point. The address of the to-be-coded change point Q is coded by the relative distance ($d_1$ or $d_2$) between it and the final reference change point selected as described above (In the case of $d_2$, if the to-be-coded change point Q is located further to the right than the reference change point $P_2$ or at the same position as the latter, a sign + is added to the abovesaid address, and if the change point Q is located further to the left than the reference change point $P_2$, a sign − is added.). In the example of FIG. 1, $d_1 = 6$ and $d_2 = -1$, and $|d_2| \leq d_1$, so that the reference change point $P_2$ is used as the final reference change point and the address of the change point Q is coded in the form of $d_2 = -1$.

The above is the method for coding information change picture elements in a facsimile signal proposed by the present inventors. In this coding method, since the length of deviation of the to-be-coded change point from a change point on the immediately preceding scanning line is generally coded, the coded distance is very short (for example, about three picture elements on an average), as compared with the coded distance in the conventional run-length coding method (for instance, about thirty picture elements on an average), and the number of bits necessary for coding is also reduced. Accordingly, this coding method is very excellent in the compression effect. However, since this method does not utilize the property of the facsimile signal that the length of deviation of a certain change point and that of the next change point have a correlation to each other, the method has a defect that its compression effect is not always satisfactory. This property of the facsimile signal is as follows: In FIG. 1, the coded distance of the change point $P_1$ is a value of $-1$ and that of the change point Q is a value of $-1$, and the both coded distances have a correlation to each other; for example, if the coded distance of the change point $P_1$ is a value of $-1$, the probability of the coded distance of the next change point Q being a value of $-1$ is high.

As a solution for the abovesaid defect of the already-proposed method for coding information change picture elements in a facsimile signal, the following method is considered: That is, the length of a run between the change point to be coded and the change point immediately preceding it (for instance $d_1$ or the like in the example of the facsimile signal shown in FIG. 1) is considered as a factor indicating the address of the change point of the facsimile signal, and in the coding of this length, the length of the run to be coded is predicted on the basis of the run length already coded and the difference between the predicted value and an actual value of the to-be-coded run length is coded. This method will hereinafter be referred to as the run-length predictive coding method, which will be concretely described in connection with drawings.

Figure 2:
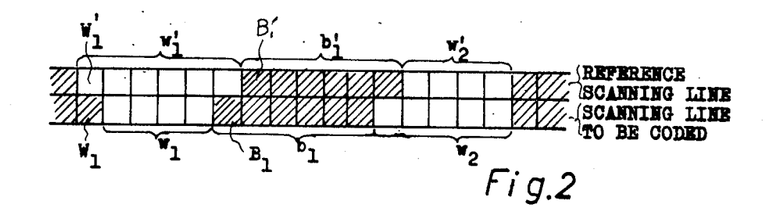
FIG. 2 is a scanning line pattern explanatory of the principle of the run-length predictive coding method employed in this invention.

FIG. 2 is a diagram showing the same facsimile signal as that in FIG. 1 from the viewpoint of the run. Reference character $b_1$ indicates a black run on the to-be-coded scanning line; $w_1$ and $w_2$ designate white runs on the to-be-coded scanning line; $b_1'$ denotes a black run on the reference scanning line; and $w_1'$ and $w_2'$ identify white runs on the reference scanning line. For example, the length of the run $b_1$ (the run length) is indicated by $\overline{b_1}$. Now, let it be assumed that the run length $b_1$ representing the address of the change point Q is to be coded. At this time, the reference run is selected with respect to the to-be-coded run $b_1$ in the following manner: If a first picture element $B_1$ of the to-be-coded run $b_1$ (which picture element is the same as that $P_1$ in FIG. 1) has the same information as the picture element just above it, the run including the picture element just above the picture element $B_1$ is used as the reference run of the run $b_1$. Where the first picture element $B_1$ of the to-be-coded run $b_1$ does not have the same information as the picture element just above it, the run immediately following the run including the picture element just above the picture element $B_1$ is used as the reference run of the run $b_1$. In the example of FIG. 2, the information of the picture element just above the picture element $B_1$ is white, and hence is different from the information of the latter $B_1$ (black), so that the run $b_1'$ following the run $w_1'$ including the picture element just above that $B_1$ is selected as the reference run of the to-be-coded run $b_1$. After the reference run is selected in the above way, the difference $\overline{b_1} - \overline{b_1'}$ between the run lengths $\overline{b_1}$ and $\overline{b_1'}$ of the to-be-coded coded run $b_1$ and the reference run $b_1'$ is taken as $f$. The to-be-coded run $b_1$ is coded as follows:

(i) When $\overline{b_1} \leq |f|$, the run length $\overline{b_1}$ is coded as it is.

(ii) When $|f| < \overline{b_1}$, the difference $f$ is coded (which includes the sign $+$ or $-$).

The above description has been given in connection with the black run $b_1$, but the above equally applies to the white runs $w_1$ and $w_2$.

In the example of the facsimile signal shown in FIG. 2, the run $b_1'$ is selected as the reference run for the run $b_1$ to be coded. $\overline{b_1} = 6$, and $|f| = |\overline{b_1} - \overline{b_1'}| = 6 - 6 = 0$ and $|f| \leq \overline{b_1}$, so that $f = 0$ is coded. For other runs, for instance, $w_1$ and $w_2$, the runs $w_1'$ and $w_2'$ are similarly selected as the reference runs, respectively, and coded $-2$ and $+1$, respectively. In this case, an error $|f| - \overline{b_1}$ may be coded.

In a case where no reference run exists on the reference scanning line, for example, where all the information of the reference scanning line is white and no black picture element exist on the reference scanning line, there is no reference run for a black run, so that in the coding of the black run, a predetermined number of picture elements (for instance, two, four, or more) at the right end portion of the reference scanning line are provisionally regarded as black picture elements. In other words, when there is no reference run, coding is achieved, with the length of the reference run as the predetermined number of picture elements.

The above is the run-length predictive coding method. In this coding method, the coded distance is very short and the number of bits for coding is small, and consequently the compression effect is remarkedly large. However, a closer examination of the property of the facsimile signal shows that the white and black runs are different in property from each other. Namely, in general, the black has a high correlation to the black run on the immediately preceding scanning line, and an algorithm of achieving a prediction based on the value of the black run on the immediately preceding scanning line is suitable for use in this case. On the other hand, the white run has an appreciably high correlation to the white run on the preceding scanning line, but the correlation is not so high as the black run. The reason is that the white run is the distance between the black runs, and that there is not so high correlation between the two black runs separated by the white. That is, the run-length predictive coding method has such a disadvantage that the compression effect is not sufficient for the coding of the white run, i.e. the change point that the information changes from black to white.

This invention eliminable of the defects of the abovesaid two methods will now be described.

Figure 3:
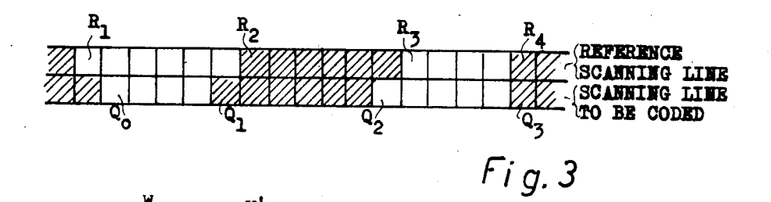
FIGS. 3, 4 and 5 are scanning line patterns explanatory of the coding method of this invention.

For example, in the coding of a facsimile signal of FIG. 3 according to the coding method of this invention, since a change point $Q_1$ is a change point from white to black, the relative distance $-1$ to a change point $R_1$ on the reference scanning line is coded by the inforamtion change picture element address coding method. On the other hand, since a change point $Q_2$ is a change point from black to white, the difference $\overline{Q_1Q_2} - \overline{R_1R_2} = 6 - 6 = +0$ between the run-length $\overline{Q_1Q_2}$ of black and the run length $\overline{R_2R_3}$ of black on the reference scanning line is coded by the run-length predictive coding method. Similarly, in the case of a change point $Q_3$, the relative distance $+0$ to a change point $Q_4$ on the reference scanning line is coded.

This invention employs the coding method suitable for the property of each change point, and hence provides for enhanced compression effect. In this invention, two kinds of coding methods are utilized as described above, and they can be summarized in the form of such algorithm as follows:

(i) For all change points, the reference run is determined in accordance with the run-length predictive coding method.

(ii) For the change point from black to white, the run-length predictive coding is effected in connection with the immediately preceding black run.

(iii) For the change point from white to black, the run-length predictive coding described hereunder in (iv) is achieved with regard to the immediately preceding white run.

Figure 4:
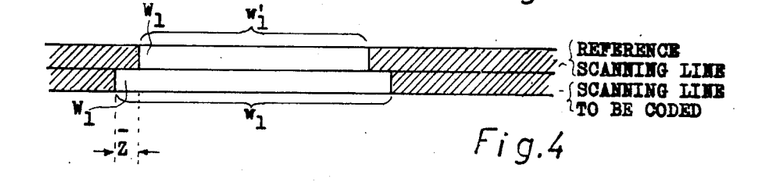
Figure 5:
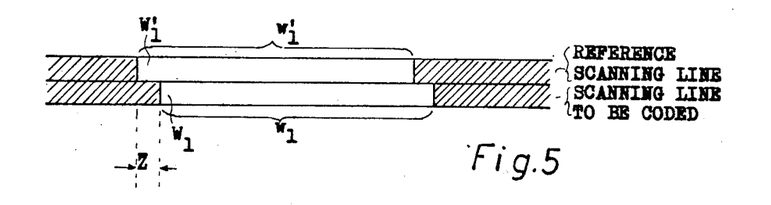

(iv) A predictive value $\hat{w}_1$ of the length of the white run $w_1$ to be coded, in a case where the picture element just above the first picture element $W_1$ of the white run $w_1$ is a black picture element as shown in FIG. 4, is selected such that $\hat{w}_1 = \overline{w_1'} + \overline{Z}$, where $\overline{w_1'}$ is the length of the reference run $w_1'$ of the white run $w_1$ and $Z$ is the distance between the starting picture element $W_1$ of the run $w_1$ and a starting picture element $W_1'$ of the white run $w_1'$. Further, where the picture element just above the starting picture element $W_1$ of the white run $w_1$ is a white picture element, it is selected such that $\hat{w}_1 = \overline{w_1'} - \overline{Z}$. After the predictive value is thus determined, the difference $\overline{w_1} - \hat{w}_1 = f$ between the abovesaid distance $\overline{w_1}$ and the predictive value $\hat{w}_1$ is obtained. If $\overline{w_1} < |f|$, $\overline{w_1}$ is coded, and if $|f| \leq \overline{w_1}$, $f$ is coded (including the sign $+$ or $-$).

For the white run, by changing its predictive value as set forth above, the method for coding addresses of information change picture elements can be handled as a modification of the run-length predictive coding method.

Figure 6:
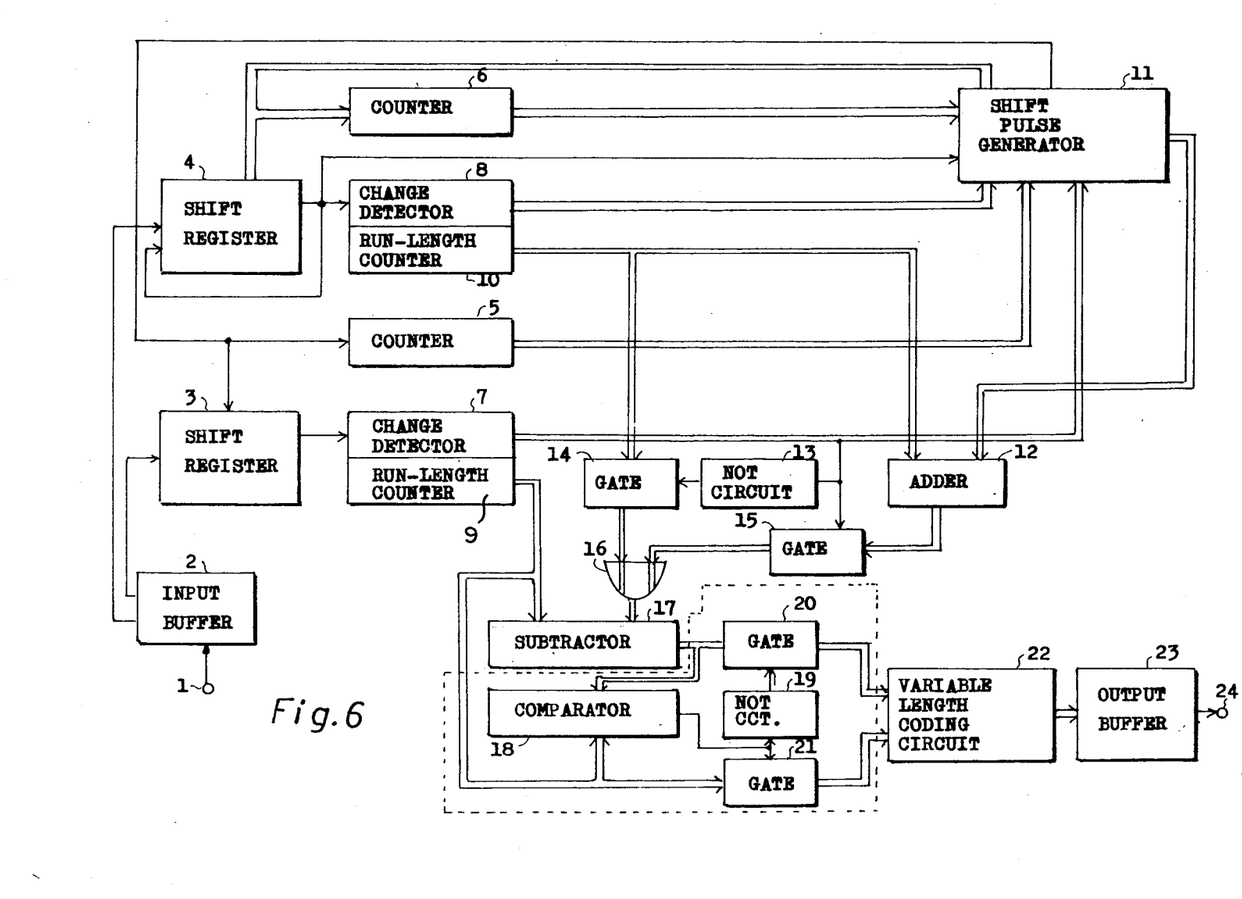
FIG. 6 is a block diagram illustrating an embodiment of this invention.

FIG. 6 is a block diagram illustrating an embodiment of the method of this invention. In FIG. 6, reference numeral 1 indicates an input terminal for receiving a readout facsimile signal; 2 designates an input buffer for temporarily storing the received facsimile signal; 3 identifies a shift register for reading and storing information of one scanning line (to be coded) from the input buffer 2 for coding; 4 denotes a two-way shiftable shift register for storing information of a scanning line (the reference scanning line) immediately preceding the scanning line stored in the shift register 3; 5 represents a counter for counting how many times the content of the shift register 3 has been shifted; 6 shows a reversible counter for counting how many times the content of the register 4 has been shifted; 7 and 8 refer to change detectors for detecting a picture element (a picture element having changed from white to black or from black to white) whose information is different from that of the immediately preceding picture element when the contents of the shift registers 3 and 4 are shifted, respectively; 9 and 10 indicate run-length counters for counting the number of picture elements, i.e. the run lengths in the time interval between change detections by the change detectors 7 and 8; 11 designates a shift pulse generator which receives the results of the change detection from the change detectors 7 and 8 to produce shift pulses for shifting the contents of the shift registers 3 and 4; 12 identifies an adder for adding together the run length of the reference run indicated by the run-length counter 10 and the value (a value corresponding to $\overline{Z}$ in FIGS. 4 and 5) counted by the shift pulse generator 11 to obtain the predictive value of the run length for the white run; 13 denotes a NOT circuit; and 14 and 15 represents gates. When the run to be coded is a black run, the gate 14 is opened and the gate 15 closed, and when the run to be coded is a white run, the gate 14 is closed and the gate 15 opened. Reference numeral 16 shows an OR circuit; 17 refers to a subtractor for subtracting the predictive value obtained from the OR circuit 16 from the run-length of the to-be-coded run indicated by the run-length counter 9; 18 indicates a comparator for comparing the run length of the to-be-coded run indicated by the run-length counter 9 with the value derived from the subtractor 17, i.e. the difference between the actual run length and its predictive value; to decide the magnitudes of their absolute values; 19 designates a NOT circuit; 20 and 21 identify gates; 22 denotes a variable-length coding circuit using known techniques; 23 represents an output buffer; and 24 shows an output terminal.

The operation of the circuit shown in FIG. 6 is as follows: A facsimile signal read out by scanning from the original picture to be transmitted is temporarily stored in the input buffer 2 through the input terminal 1. The facsimile signal stored in the input buffer 2 is read out line by line into the shift register 3 for coding. At this time, the shift register 4 is at a standstill in the condition that the information of the scanning line (the reference scanning) immediately preceding the scanning line stored in the shift register 3 is stored in the shift register 4, and this information is used as reference information in the coding of the information stored in the shift register 3. The information of the to-be-coded scanning line stored in the shift register 3 is shifted by the shift pulse of the shift pulse generator 11 and the picture elements are delivered out one by one from the left end of the picture frame to the change detector 7. In the change detector 7, it is always examined whether or not the information of the picture element received at each moment is different from the immediately preceding picture element. The counter 5 indicates how many times the shift register 3 has been shifted, in other words, to which picture element from the left end of the original picture the picture element information having been just delivered out from the shift register 3 to the change detector 7 corresponds. When detecting a change of the facsimile signal from white to black or from black to white, the change detector 7 applies a pulse indicative of the detection of the change to the shift pulse generator 11 and, at the same time, supplies thereto information of the direction of the change. As a result of this, the shift pulse generator 11 stops a supply of the shift pulse to the shift register 3 to stop its operation. At this time, the run-length counter 9 indicates the number of picture elements counted from the time of the immediately preceding change detection to the time of the instant one, in other words, the run length in this time interval. For the sake of ready explanation, the following description will be given with respect to the example of the facsimile signal of FIG. 2 and on the assumption of coding the address of the change point $B_1$, that is, the white run $w_1$. The counter 5 indicates the absolute address (the number of picture elements counted from the left end of the picture frame) of the picture element $B_1$ following the white run $w_1$, while the counter 9 indicates the length $\overline{w_1}(=4)$ of the white run $w_1$.

When the operation of the shift register 3 is stopped to detect the change point B on the to-be-coded scanning line, as described above, the next step is to find out a change point on the reference scanning line, detect the run of the same information as the run to be coded and then determine the reference run. The determination of the reference run is achieved in the following manner. In the shift pulse generator 11, there is stored the previous count value of the counter 5, that is, the absolute address of the change point ($W_1$) immediately preceding the change point B the absolute address of which is being indicated, and this value is compared with the value of the counter 6. At this time, the counter 6 indicates where the picture element (that is, $W_1'$ in this example) at the output of the shift register 4 stands from the left end of the original picture, as is the case with the counter 5. In the shift generator 11, the count value (which is taken as $x$) of the counter 6 and the previous count value (which is the absolute address of $W_1$ in FIG. 1 and is taken as $y$) of the counter 5 are compared with each other, and if $x > y$, a backward shift pulse (The operation that the picture element at the output of the shift register 4 is sequentially shifted toward the left end of the original picture is defined as a backward shift, and the normal rightward shift reverse to the above is defined as a forward shift. Pulses for achieving these shifts will hereinafter be referred to as the backward shift pulse and the forward shift pulse, respectively.) is applied to the shift register 4 to cause it to shift in its backward direction. When the shift register 4 is shifted backwardly to reach $x = y$, the supply of the backward shift pulse is stopped. If $x < y$, the shift pulse generator 11 applies the forward shift pulse to the shift register 4, and when $x = y$ is reached, the supply of the pulse is similarly stopped.

When $x = y$ is thus obtained, the shift pulse generator 11 compares the information of black or white of the to-be-coded run $w_1$ (In this example, the run is white and this is known from the output from the change detector 7.) with the information (white) of the picture element at the output of the shift register 4, this is, the picture element just above the picture element $W_1$ in the example of FIG. 1. (i) When the both are identical with each other, the run including the picture element just above the picture element $W_1$ is the reference run, so that the shift pulse generator 11 starts to supply the backward shift pulse to the shift register 4, and when a change is detected by the change detector 8, the supply of the pulse is stopped. (ii) When the both are different from each other, the run following the run including the picture element just above the picture element $W_1$ is the reference run, so that the shift pulse generator 11 starts to supply the forward shift pulse to the shift register 4, and when a change is detected by the change detector 8, the supply of the pulse is likewise stopped.

In the example of FIG. 2, since the information of the run $w_1$ to be coded is white and since the information of the picture element just above the picture element $W_1$ is black, this case corresponds to the abovesaid case (i), and then the shift register 4 shifts in the backward direction corresponding to two shift pulses and stops.

When the starting picture element $W_1'$ of the reference run $w_1'$ is detected in the abovesaid way, the run length $w_1'$ of the reference run $w_1'$ is calculated. Namely, the shift pulse generator 11 starts to apply the forward shift pulse to the shift register 4, and when the change detector 8 detects the next change point (when the picture element $B_1'$ is detected in the example of FIG. 2), the supply of the shift pulse is stopped. The value indicated by the run-length counter 10 at this time is the run length $\overline{w_1'}$ of the reference $w_1'$. The above operation is also equally applicable to the black run (for instance, the black run $b_1$ in FIG. 2).

Where the run to be coded is a white run, it is detected by the change detector 7 and the gate 17 is opened but the gate 14 remains closed. The run length information $\overline{w_1'}$ of the reference run $w_1'$ and the value of the distance between the picture elements $W_1'$ and W in FIG. 2, which is obtained by the shift pulse generator 11 (which value corresponds to $\overline{Z}$ in FIGS. 4 and 5, and becomes minus in such a case of FIG. 4 and plus in such a case of FIG. 5), are added together in the adder 12, and the output from the adder 12 becomes the run-length predictive value $\hat{w_1}$ of the white run $w_1$. This predictive value $\hat{w_1}$ is applied to the subtractor 17 through the gate 15 and the OR circuit 16. The subtractor 17 calculates the error $w_1 - \hat{w_1}$ between the run-length $\overline{w_1}$ of the to-be-coded run $w_1$ and its predictive value $w_1$. In the comparator 18, the absolute value of the output from the subtractor and the run-length $\overline{w_1}$ of the to-be-code run $w_1$ are compared in magnitude with each other, and by the action of the NOT circuit 19 and the gates 20 and 21, the value of the smaller absolute value is applied to the variable-length coding circuit 22. In other words, $\overline{w_1}$ or $\overline{w_1} - \hat{w_1}$, depending upon whether $\overline{w_1} < |\overline{w_1} - w_1|$ or $|\overline{w_1} - \hat{w_1}| \leq \overline{w_1}$, is converted by the variable-length coding circuit 22 into a variable-length code, for example, as shown in Table 1, which code is temporarily stored in the output buffer 23 and then delivered out at a constant speed to the transmission line through the output terminal 24.

Table 1

| Absolute value of error | Code |
|---|---|
| 1 | 0 |
| 2 | 1 0 |
| 3 | 1 1 0 |
| 4 | 1 1 1 0 |
| . | . |
| . | . |
| . | . |
| Sign of difference + | 0 |
| − | 1 |
| When error is zero 0 | |
| When error exists | 1 |

On the other hand, where the to-be-coded run is a black run, it is also detected by the change detector 7, and the gate 14 is opened but the gate 15 remains closed. Namely, the value (the run length of the reference run) indicated by the run-length counter 10 is applied as it is, through the gate 14 and the OR circuit 16. The subsequent operation is exactly the same as in the case of the white run, and only the predictive value is different from that in the latter.

As mentioned previously, if the error is always coded without comparing the to-be-coded run with an error between the predicted value and the to-be-coded run, the output of the subtractor is directly applied to the variable-length coder 22.

Figure 7:
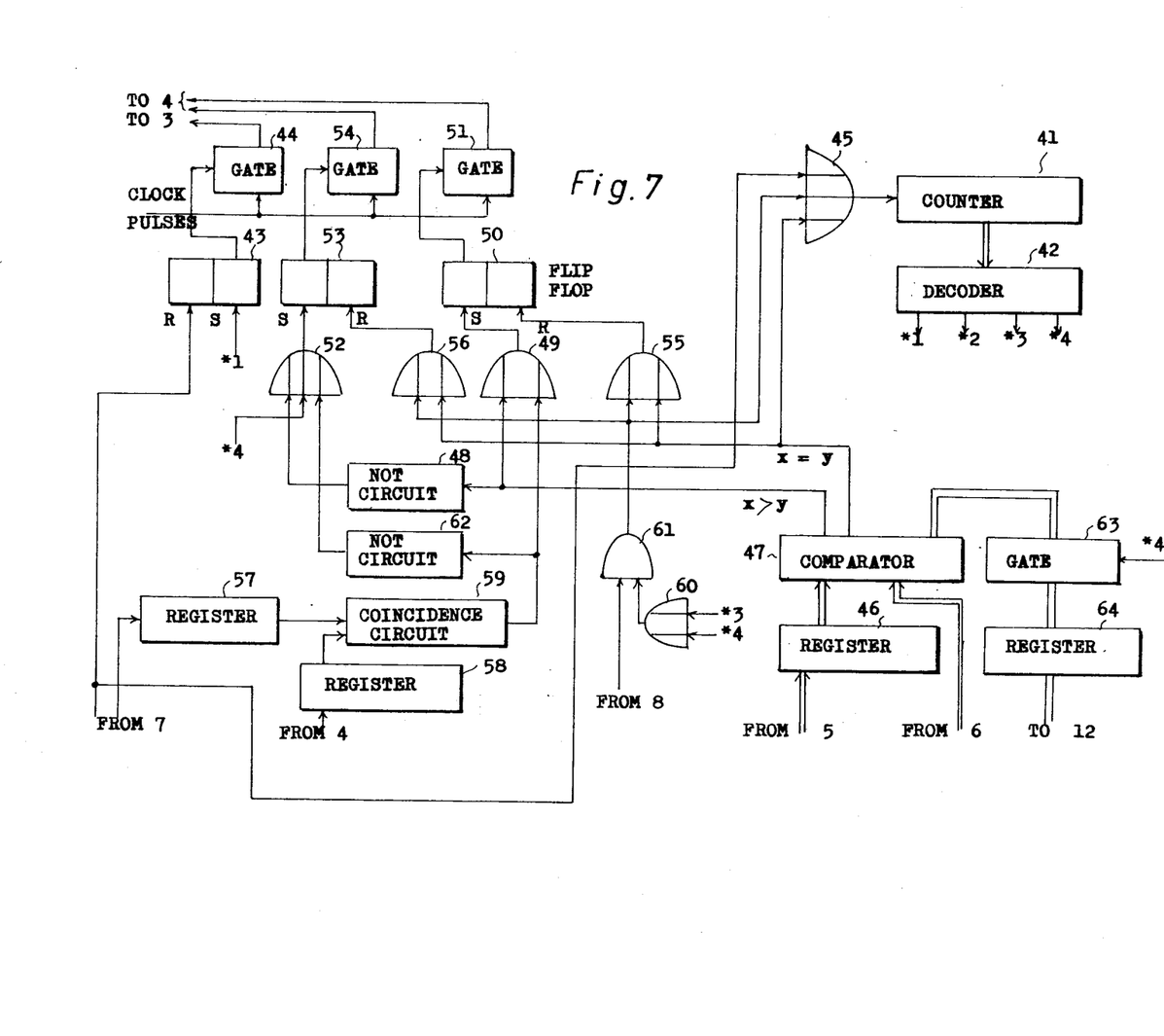
FIG. 7 is a block diagram illustrating an example of a shift pulse generator employed in the embodiment shown in FIG. 6.
Figure 8:
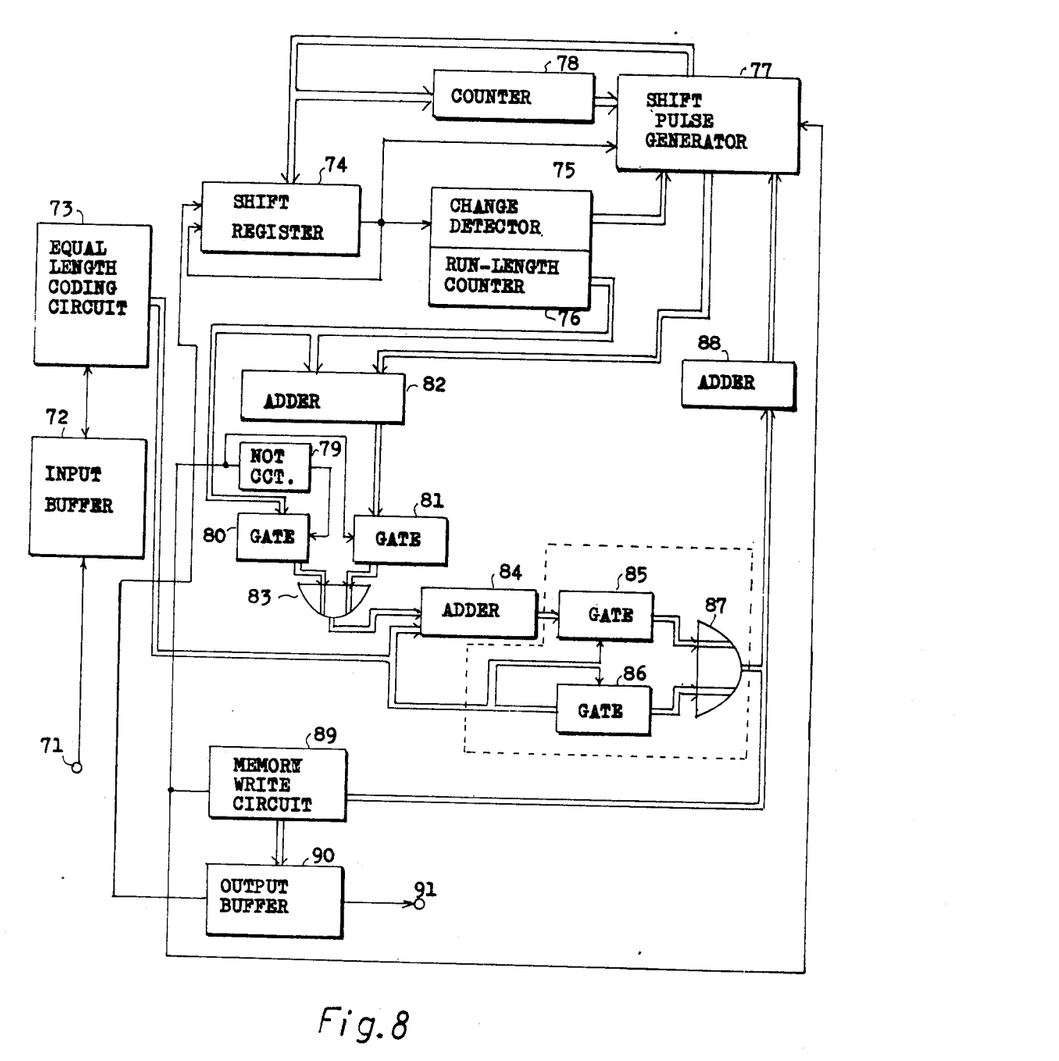
FIG. 8 is a block diagram illustrating an example of the receiving side for receiving a facsimile signal produced in the embodiment shown in FIG. 6.

FIG. 7 illustrates in detail the shift pulse generator 11 depicted in FIG. 6. As already described, this is a circuit for generating shift pulses for achieving the shift operations of the shift registers 3 and 4, and the operation of this circuit is divided into four as follows:

white run when the coded run is the white run; 83 represents an OR circuit for producing as its output the predictive value of the coded run; 84 shows an adder for adding together the predictive value from the OR circuit 83 and the coded distance of the coded run derived from the equal-length coding circuit 73 to calculate the run length of the coded run; 85 and 86 refer to gates; 87 indicates an OR circuit for providing the run length of the coded run; 88 designates an adder for integrates the run length of the coded run of each scanning line to indicate the absolute value of the picture element next to the decoded coded run; 89 identifies a memory write circuit which receives the run-length information of the coded run from the OR circuit 87 to write the information in an output buffer 90 in the form of a facsimile signal which can be recorded; 90 denotes the output buffer for storing the decoded facsimile signal until it is recorded; and 91 represents an output terminal through which the decoded facsimile signal is applied from the output buffer to a recording section.

The operation of the receiving side shown in the block diagram of FIG. 8 is as follows: The received facsimile coded signal is temporarily stored in the input buffer 72 through the input terminal 71. The signal stored in the input buffer is the variable-length coding circuit 73, the signal is converted into equal-length codes of the same length (for example, ten bits). On the other hand, the shift register 74 has stored therein an already-decoded facsimile signal, and the shift register 74 and the circuits 75, 76, 77 and 78 respectively perform substantially the same operations as the shift register 4, the change detector 8, the run-length counter 10, the shift pulse generator 11 and the counter 6 shown in FIG. 6, by which the reference run is determined, and the run length of the reference run is obtained as the output from the run-length counter 76.

When the coded run is a white run, the run length of the reference run and the value (a value corresponding to $\overline{Z}$ in FIGS. 4 and 5) derived from the shift pulse generator 77 are added together in the adder 82 to calcuate a predictive value of the white run. At this time, the gate 81 is opened but the gate 80 is closed, so that the predictive value of the white run is applied to the OR circuit 83. Where the coded run is a black run, the run length of the reference run becomes a predictive value, as it is, and the gate 80 is opened but the gate 81 is closed, so that the predictive value of the black run is also applied to the OR circuit 83. A switching control of opening and closing the gates 80 and 81 is performed at each completion of decoding of one change point, that is, each time the memory write circuit 89 writes the decoded information in the output buffer.

On the other hand, since the output from the equal-length coding circuit 73 includes the information as to whether the coded run has been coded in terms of its run length or the difference between the run length and its predictive value, and the information of the coded distance, the opening and closing control of the gates 85 and 86 is effected by the former information. Namely, in a case where the coded run has been coded on the basis of its run length, the gate 85 is closed but the gate 86 opened. Conversely, where the coded run has been coded in terms of the difference between its actual run length and the predictive value, the gate 85 is opened but the gate 86 closed. Further, the information of the coded distance is applied to the adder 84 and the gate 86, so that in the latter case, the run length of the coded run is calculated in the adder 84, and this value is supplied to the memory write circuit 89 through the gate 85 and the OR circuit 87. In the former case, the run-length information from the equal-length coding circuit 73 is also applied to the memory write circuit 89 through the gate 86 and the OR circuit 87. On the other hand, the output from the OR circuit 87, that is, the run lengths of respective coded runs, are sequentially added together in the adder 88 to indicate the absolute address of the starting picture element of the next coded run. The output from the OR circuit 87 is applied to the memory write circuit 89, and then stored in the output buffer 90 as a facsimile picture signal which can be recorded. In this manner, decoding is achieved and, upon completion of decoding of the information of each scanning line, since the information of the scanning line is used as the information of the reference scanning line in the next decoding, it is supplied to the shift register 74, and the adder 88 is reset to the state "1".

The shift pulse generator 77 in FIG. 8 is substantially identical with the circuit shown in FIG. 7, but since the output from the adder 88 is always indicative of the absolute address ($y$) of the starting picture element of the coded run, the output from the adder 88 is connected directly to the comparator 47, not through the register 46. Moreover, in FIG. 8, there are no circuits corresponding to the change detector 7 and the shift register 3, so that the shift pulse generator 77 does not require the flip-flop 43 and the gate 44 used in the example of FIG. 7. Further, the register 57 takes the form of a flip-flop, and since this flip-flop is required only to indicate the information (white or black) of the coded run, the input to the flip-flop is the output pulse from the memory write circuit.

In a case where the errors were alway coded without comparing the to-be-coded run with an error between the predicted value and the to-be-coded run, the output of the adder 84 is directly applied to the adder 88 and the memory write circuit 89 in FIG. 8.

As has been described above in detail, this invention classifies the change points into two kinds according to the direction of change, and achieves coding suitable for each of them. This invention can be realized with a relatively simple circuit construction, and enables a remarked reduction of the transmission time.

What we claim is:

1. A method of coding a facsimile signal, comprising:
    classifying information change picture elements of a facsimile signal into two classes according to the information change directions of the picture elements;
    selecting information change picture elements classified as having an information change from white to black;
    coding the shorter of a first distance from an instant information change picture element to be coded to a first reference black-to-white information change picture element immediately proceeding said instant information change picture element on the same scanning line, and a second distance on an immediately preceeding scanning line from a picture element just above said instant information change picture element to a second white-to-black information change picture element immediately succeeding a picture element just above said first reference black-to-white information change picture element;

(i) An operation of shifting the shift register 3 to detect a change point and stopping the shift;

(ii) An operation of shifting the shift register 4 to obtain the value $x = y$;

(iii) An operation of shifting the shift register 4 to the first picture element of the reference run and stopping the shift; and (iv) An operation of shifting the shift register 4 to the last picture element of the reference run and stopping the shift.

In FIG. 7, reference numeral 41 indicates a 2-bit counter which indicates the abovesaid four states; and 42 designates a decoder whose output *1 is in the ON-state, for example, in the case of the state (i).

Now, let it be assumed that the state (iv) has been completed and altered to the state (i). Then, the output *1 is turned —ON, so that a flip-flop 43 is set to open a gate 44, through which a clock pulse is applied to the shift register 3. This pulse serves as the shift pulse for shifting the shift register 3. Where the shift register 3 shifts and the change detector 7 detects a change point, the flip-flop 43 is reset to close the gate 44 to stop the supply of the pulse to the shift register 3 and hence stop its shifting. At this time, since the pulse from the change detector 7 is applied to the counter 41 through an OR circuit 45, the state (ii) is brought about to turn ON the output *2.

Reference numeral 46 identifies a register, which stores the previous count value ($y$ mentioned previously) of the counter 5. This value and the value ($x$ mentioned previously) of the counter 6 are compared in magnitude with each other in a comparator 47. When $x = y$, the comparator 47 produces a pulse, and since this pulse is applied to the counter 41 through the OR circuit 45, the state is immediately altered to (iii). If $x > y$, the comparator 47 applies pulses to a NOT circuit 48 and an OR circuit 49. By the output pulse from the latter, a flip-flop 50 is set to open a gate 51, through which clock pulses are applied to the shift register 4. These are the backward shift pulses. Conversely, if $x < y$, a flip-flop 53 is set through an OR circuit 52 to open a gate 54, through which clock pulses are also applied to the shift register 4. These are the forward shift pulses. When the shift register 4 shifts to reach the value $x = y$, the comparator 47 applies a pulses to OR circuits 55 and 56 to reset the flip-flops 50 and 53, so that the supply of the shift pulses to the shift register 4 is stopped and, at the same time, by the pulse through the OR circuit 45, the operation state is shifted to the state (iii).

When the operation state is changed to the state (iii), the output *3 is turned-ON. The first picture element of the reference run is obtained by the change detector 8 in the manner described hereunder. Reference numerals 57 and 58 denote registers. The registers 57 and 58 receive 1-bit information from the change detector 7 and the shift register 4, respectively, and indicate the information (white or black) of the to-be-coded run and the information (white or black) of the picture element lying at the output of the shift register 4. Reference numeral 59 identifies a coincidence circuit. If the outputs from the registers 57 and 58 are coincident with each other, the coincidence circuit 59 derives therefrom a pulse, so that the backward shift pulses are applied to the shift register 4 in the same manner as the abovesaid operation. Reference numeral 60 represents an OR circuit, and 61 shows an AND circuit. When the shift register 4 is shifted in the backward direction and a change is detected by the change detector 8, both inputs to the AND circuit 61 are turned —ON to reset the flip-flops 50 and 53 to stop the supply of the shift pulse to the shift register 4. The picture element lying at the output of the shift register 4 at this time is the first picture element of the reference run. On the other hand, if the outputs from the registers 57 and 58 are different from each other, the coincidence circuit 59 does not produce any pulse but instead the NOT circuit 62 produces a pulse, by which the flip-flop 53 is set to apply the forward shift pulses to the shift register 4, and when the change detector 8 detects a change point, the shift operation of the shift register 4 is stopped. The picture element lying at the output of the shift register 4 at this time is similarly the first picture element of the reference run. When the AND circuit 61 produces a pulse, this pulse is applied to the counter 41 through the OR circuit 45, thus shifting the operation state to the state (iv).

When the operation state is altered to the state (iv), the output *4 is turned —ON to open the gate 63, through which the value $(x-y)$ (a value corresponding to $\bar{Z}$ in FIGS. 4 and 5) is applied from the comparator 47 to a register 64, and this information is used in the adder 12 in FIG. 6, as described previously. Next, the run length of the reference run is obtained. When the output *4 is turned —ON, the flip-flop 53 is set through the OR circuit 52 to apply the forward shift pulses to the shift register 4. Thereafter, when a change is detected by the change detector 8, the AND circuit 61 produces a pulse to stop the shift operation of the shift register 4 and the counter 41 indicates the state (i) and the output *1 is turned —ON to restore the initial operation. The value indicated by the run-length counter 10 at this time is used as the run length of the reference run.

FIG. 8 is a block diagram illustrating an example of the construction of the receiving side for the reception of the facsimile signal produced in accordance with the embodiment of this invention shown in FIG. 6. Reference numeral 71 indicates an input terminal for receiving a coded facsimile signal; 72 designates an input buffer for once storing the received facsimile signal; 73 identifies a known equal-length coding circuit for converting the variable-length codes shown in Table 1 into equal-length codes; 74 denotes a reversible shift register for storing the signal of a reference scanning line of an already decoded facsimile signal; 75 represents a change detector which receives the shifted picture information from the shift register 74 to examine whether or not the picture element information is different from the immediately preceding one, and, if different, provide change indicative information and the information of the change direction (from white to black or from black to white); 76 shows a run-length counter which is supplied with the output from the change detector 75 to obtain the distance (the number of picture elements) between the picture element having detected the change (the change point) and the picture element having detected the next change, that is, the run length between the two change points; 77 refers to a shift pulse generator which is supplied with the information from the change detector 75 to generate pulses for forwardly or bakcwardly shifting the shift register 74; 78 indicates a counter which receives the output from the shift pulse generator to count the number of pulses, in other words, indicate which picture element from the left end of the orginal picture is lying at the output of the shift register 74; 79 designates a NOT circuit; 80 and 81 identify gates; 82 denotes an adder for calculating a predictive value of a selecting information change picture elements classified as having an information change from black to white;

predicting a distance from an instant information change picture element to be coded to the immediately preceeding information change picture element on the basis of a previously coded run; and coding the error between the predicted value and the run length of the instant run.

2. A method according to claim 1, further including:

detecting that the error exceeds the run length of the instant run; and coding the run length of the instant run in place of the error only when the error exceeds the run length of the instant run.

* * * * *